Patented Dec. 13, 1938

2,140,140

UNITED STATES PATENT OFFICE 2,140,140

RECOVERY OF MALEIC ANHYDRIDE

Elton B. Punnett, Buffalo, N. Y., assignor to National Aniline & Chemical Company, Inc., New York, N. Y., a corporation of New York No Drawing. Application November 30, 1936, Serial No. 113,534

30 Claims. (Cl. 260—343)

This invention relates to the recovery of organic products of partial oxidation of organic compounds from mixtures containing them in the vapor phase. It relates specifically to a method of recovering maleic anhydride from mixtures containing it in the vapor phase together with water vapor, and particularly from gaseous mixtures resulting from the vapor phase catalytic partial oxidation of organic compounds.

In the manufacture of organic products by the partial oxidation of organic compounds in accordance with one well known method heretofore generally practiced, vapors of an organic compound, as for example, benzene, naphthalene, anthracene, phenanthrene, acenaphthene, phenol, tar acids, their derivatives, etc., are mixed with air or other oxidizing gas, the mixture is brought into contact with an oxidation catalyst under controlled reaction conditions, and the resulting reaction mixture is cooled to condense the partial oxidation product thereby formed. The reaction mixtures resulting from the catalytic oxidation generally contain, in addition to the desired products, a number of other substances in various amounts which sometimes condense with the desired products, thereby contaminating them, so that a subsequent purification of the desired products is generally required before they can be employed for the usual purposes.

In the course of the catalytic oxidation, water is formed as one of the by-products of the reaction and it frequently condenses with some of the partial oxidation products, particularly at low temperatures. If, in addition, the desired product is reactive toward water at the temperature of condensation, as for example, maleic anhydride, it has been the practice to absorb the gaseous reaction mixture in water, and then dehydrate the resulting product by a separate process.

An object of the present invention is to provide a method of recovering organic partial oxidation products which are reactive with water, directly from mixtures containing them together with water, while preventing reaction with the water.

A further object of the invention is to provide a method of recovering maleic anhydride directly in the form of the anhydride from a mixture containing maleic anhydride and water vapors.

Another object of the invention is to provide a method of recovering maleic anhydride in an efficient and economical manner directly in the form of the anhydride from a gaseous mixture containing the same, more particularly, from a gaseous mixture also containing water, and especially from a gaseous reaction mixture resulting from the catalytic partial oxidation of an organic compound in the vapor phase.

Other objects of the invention will in part be obvious and will in part appear hereinafter.

The invention will be described in connection with the recovery of maleic anhydride from gaseous reaction mixtures resulting from the catalytic partial oxidation of an organic compound in the vapor phase. The invention is not limited thereto, however, and various changes may be made in the material treated and in the method and details of procedure without departing from the scope of the invention as defined in the appended patent claims.

Maleic anhydride is a well known organic chemical substance melting at about 52° C. and boiling at about 200° C. According to Beilstein, Vol. XVII (fourth edition), p. 433, it is converted exceedingly rapidly to maleic acid by water. Maleic acid on the other hand is converted to maleic anhydride and water upon heating at temperatures of about 130° C. or above.

Maleic anhydride is produced from organic compounds, in accordance with one known procedure, by passing the organic compound, for example, benzene, in the vapor phase mixed with oxygen, air, or other gas mixture containing free oxygen, through an enclosed space (such as a so-called converter tube) containing an oxidation catalyst, which is usually deposited upon a carrier. The resulting reaction mixture contains maleic anhydride, water vapor, nitrogen, CO, $CO_2$, and other products of combustion.

Heretofore, in the recovery of the maleic anhydride from such reaction mixtures, it has been the general practice to recover the maleic anhydride and the water vapor jointly in the form of maleic acid, for example, by absorbing the products of the reaction in water or by cooling the reaction mixtures to condense the products including the water vapor; and, when maleic anhydride was desired, to then convert the recovered maleic acid to the anhydride by a separate dehydration treatment in the presence of dehydrating agents, such as phosphorus pentoxide.

I have found, according to the present invention, when a gaseous mixture containing maleic anhydride and water vapor, and particularly one resulting from the catalytic partial oxidation of an organic compound in the vapor phase, is contacted with a water-immiscible substance which is liquid under the conditions of treatment, that the maleic anhydride is absorbed and may be directly recovered from the absorbent with high efficiency. The water vapor is not absorbed to any substantial extent and passes off with the effluent gases. As compared with the prior processes according to which the maleic acid is recovered in the form of the acid by condensation of the reaction products or absorption in water, and then converted to the anhydride by a dehydration process, the process of the invention effects a saving in the direct recovery of the maleic anhydride, and the elimination of a separate dehydration process.

I have furthermore found, in accordance with the present invention, when such gaseous reaction mixture resulting from the partial oxidation of an organic compound is treated in this manner, that the maleic anhydride is absorbed in preference to many of the impurities and consequently that the maleic anhydride may be separated from the absorbent in a purified condition. I have also found, as an additional feature of the invention, that a purification of the maleic anhydride can be effected by dissolving it at a temperature above its melting point in a solvent, permitting the solution to cool to effect crystallization, and separating the crystals.

In the practice of the present invention in accordance with a preferred method of procedure, a gaseous mixture containing maleic anhydride, such as the reaction mixture resulting from the catalytic oxidation of benzene or other suitable organic substance in the vapor phase, is passed through, or otherwise in contact with, a substantially inert liquid which is immiscible with water, preferably maintained at a temperature of approximately 45° to 70° C. The maleic anhydride is absorbed and removed from the mixture and the unabsorbed portion of the mixture is then passed to a water scrubber where the residual products are condensed and removed. The maleic anhydride may be separated from the absorbent in any suitable manner, as for example by cooling the solution to as low a temperature as practicable, permitting it to crystallize, and separating the crystals of maleic anhydride by filtration, centrifuging, or the like.

The possibility of recovering maleic anhydride as such by this procedure, notwithstanding the fact that the process is advantageously carried out at temperatures at which maleic anhydride and water ordinarily combine to form maleic acid (temperatures below 130° C.), result from the combination of several factors involved in the process; notably, the maintenance of the water in the vapor phase, and the removal of the maleic anhydride from the reactive influence of the water. The invention in one of its broader aspects accordingly comprises condensing maleic anhydride from a mixture of maleic anhydride and water vapors at a temperature at which maleic anhydride ordinarily reacts with water to form maleic acid, while retaining the water in the vapor form, and removing the maleic anhydride condensate from the reactive influence of the water vapor.

The employment of gaseous mixtures which contain, in addition to the maleic anhydride and water vapors, gases which do not react chemically with maleic anhydride under the conditions of the absorption (so-called inert gases) constitutes an advantageous method of keeping the water in the vapor phase since the presence of the inert gases reduces the water vapor pressure of the mixture to a value below the vapor pressure of liquid water at the temperature to which the vapor mixture is cooled, thereby permitting the condensation to be carried out at temperatures at which water ordinarily will condense. The use of a water-immiscible absorbent also constitutes an advantageous method of removing the maleic anhydride from the reactive influence of the water vapor, particularly in connection with a gaseous mixture containing an inert gas. Hence in the preferred practice of the invention both the inert gas and water-immiscible absorbent are employed.

The absorbent may be any suitable water-immiscible liquid. It is preferably an organic compound which is relatively inert with respect to the reaction mixture and in which the product to be recovered is soluble. For ease and efficiency in the separation of the recovered product from the absorbent, the liquid employed as absorbent should also preferably possess the following properties: it should dissolve considerably more of the partial oxidation product at higher temperatures than it does at lower temperatures, and it should melt at a relatively low temperature; i. e., it should be liquid at about 0° C. The liquid may have a relatively high vapor pressure or a relatively low vapor pressure, and liquids which boil at a relatively low temperature, for example, below 100° C., may be used as well as those which boil at higher temperatures. It is not essential, moreover, that the absorbent possess all of the characteristics above enumerated, inasmuch as satisfactory results may be secured with absorbents which possess, to a greater or less extent, some but not all of them.

When a liquid is employed which has a relatively low boiling point and/or a relatively high vapor pressure, the absorption may be carried out under superatmospheric pressure so as to minimize the loss of the absorbent carried off as vapor by the effluent gases, particularly at elevated absorption temperatures, as well as to increase the efficiency of the absorption. The pressure under which the absorbent is maintained will vary with the liquid employed as absorbent, with the temperature at which absorption is carried out, and with the solubility of the product in the absorbent. For economical commercial operation, employing as absorbent a liquid whose cost is substantial, a pressure may be employed which confines the loss of absorbent in the exit gases to about 5 per cent, preferably about 2 per cent. When a liquid is employed as absorbent which has a relatively high boiling point (for example, above 250° C.) and/or which has a relatively low vapor pressure (for example, a vapor pressure not exceeding 25 mm. of mercury at the temperature employed), or when the loss of solvent in the exit gases is not material, the absorption may be carried out under atmospheric pressure conditions.

Among the absorbents which are useful in the process, there may be mentioned, by way of example: liquid hydrocarbons of the aliphatic and aromatic series, ethers, aromatic nitro-compounds, halogenated hydrocarbons of the aliphatic and aromatic series, halogenated hydrogenated aromatic hydrocarbons, etc., and mixtures thereof; as for example benzol, toluol, solvent naphtha, petroleum ether, gasoline, motor oil, heavy solvent, diphenyl, nitrobenzol, nitrotoluene, mixtures of nitrotoluenes, diethyl ether, diphenyl oxide, chloroform, carbon tetrachloride, chlorobenzenes, chloronaphthalenes, etc.

The gaseous mixture containing the products to be recovered may be produced in any suitable manner, and if not at a suitable pressure may be compressed before being brought into contact with the absorbent. Furthermore, although various mixtures of maleic anhydride vapors with gases containing water vapor may be treated in accordance with the process of the present invention, it is preferable to employ a gas mixture containing an inert gas (such as air, $CO_2$, CO, nitrogen, etc.) in such an amount that the gas mixture will not be saturated with water vapor, and preferably not more than 50 per cent saturated with water vapor, under the temperature and pressure conditions prevailing during the absorption. Ordinarily, the gaseous reaction mixtures resulting from the catalytic partial oxidation contain a sufficient amount of inert gas for this purpose. If the gas mixture to be treated does not contain inert gas in sufficient amount, additional inert gas may be added as a diluent prior to or during the absorption of the maleic anhydride.

The temperature at which the absorption is carried out will vary with the liquid employed as absorbent, with the pressure under which the absorption is carried out, with the solubility in the liquid employed of the product to be recovered, and with the dew-point of the product in the gas mixture treated. A temperature is generally employed which is below the dew-point of the product to be recovered in the gas mixture; so that, in effect, a condensation of the product will take place in the solvent. Preferably a temperature is employed which is considerably, for example 15° to 50° C., below the dew point; which does not result in an uneconomical loss of solvent in the gas stream passing from the absorber; and at which the solubility of the product in the solvent is relatively great.

As illustrative embodiments of a manner in which the invention may be practiced, the following examples are presented. The parts are by weight:

*Example 1.*—Benzene (benzol) is vaporized, the vapors are mixed with about 25 times their weight of air, and the mixture is passed through a converter tube containing a contact mass, comprising a mixture of vanadium and molybdenum oxides on a catalyst carrier, maintained at a temperature of about 500° to about 520° C., the time of contact between the vapor mixture and the catalyst being about 0.2 second. The gas stream leaving the converter is preferably cooled to a temperature of about 110° to 150° C., and then bubbled through an absorption vessel which contains baffles, bubbler plates, or similar devices for assuring an intimate contact between the gas and liquid, and which is partly filled with alpha-chlornaphthalene maintained by suitable cooling means at a temperature of about 45° C. When the alpha-chlornaphthalene becomes saturated with maleic anhydride, it is withdrawn from the absorber and cooled, preferably to a temperature of about 3° C. A mass of small, fine, needle-like crystals of maleic anhydride settles out, and the crystals are separated from the mother liquor; as for example, by filtration or whizzing. In order to purify the maleic anhydride crystals, they are mixed with about twice their weight of solvent naphtha and heated to a temperature of about 70° C., whereupon the maleic anhydride crystals melt and go into solution in the solvent naphtha. The hot solution is filtered to remove dirt, maleic acid or other insoluble impurities, if necessary, and then slowly cooled to about room temperature to effect crystallization. The resulting crystals of maleic anhydride are washed with a small amount of solvent naphtha and dried. The maleic anhydride thus obtained is of a purity of from about 97 to 99.5 per cent.

The alpha-chlornaphthalene mother-liquor resulting from the crystallization step can be returned to the absorber for reutilization in the process. The alpha-chlornaphthalene mother-liquor can be repeatedly used in the absorption process, the amount lost being replaced by addition of alpha-chlornaphthalene, since the surprising observation has been made that there is a limited accumulation of impurities in the absorption liquid above which there is no substantial increased accumulation. The solvent naphtha mother-liquor remaining from the purification step can be reused in carrying out further purifications until the accumulation of alpha-chlornaphthalene therein becomes excessive, after which it can be subjected to distillation to separate and recover the solvent naphtha from the residual alpha-chlornaphthalene containing maleic anhydride and impurities. The recovered solvent naphtha can be reused in carrying out subsequent purifications, and the residual alpha-chlornaphthalene can be added to the absorbing liquor and reused. It will thus be evident that substantially all of the maleic anhydride produced is recovered, with the exception of that passing out of the absorber in the gas stream. The gas stream leaving the absorber and containing unabsorbed maleic anhydride, maleic acid, and other products of combustion, is passed through an absorber or absorbers containing water from which absorbed material can be recovered as an impure solution of maleic acid.

*Example 2.*—A gaseous reaction mixture containing maleic anhydride and resulting from the vapor-phase catalytic oxidation of benzene or other suitable organic substance, such as the cooled reaction mixture treated in Example 1, is bubbled through an absorption vessel which is partly filled with solvent naphtha held at a temperature of 50° to 55° C., while maintaining a superatmospheric pressure of 15 to 20 lbs. per square inch. The gases leaving the absorber are passed into a second absorber partly filled with solvent naphtha maintained at a temperature of 43° to 45° C. and at a superatmospheric pressure of 15 to 20 lbs. per square inch. The absorption vessels are equipped with suitable cooling means, with baffles, bubbler plates or similar devices for assuring an intimate contact between the gas and liquid, and with suitable means for maintaining the superatmospheric pressure. When the solvent naphtha in the first absorber has absorbed from about one-half to about six times its own weight of maleic anhydride it is withdrawn from the absorber. The maleic anhydride is separated from the solvent naphtha by cooling the mixture, preferably to about 3° C., to produce crystallization of the maleic anhydride, and the crystals are separated from the mother liquor by filtration, centrifuging, or in any other suitable manner.

The resulting crystals may be purified if desired by recrystallization from solvent naphtha, as disclosed in Example 1.

During the course of the operation, solvent naphtha is introduced into the absorbers by means of suitable devices, such as a feed tank under pressure, to replace that lost by volatilization and/or entrainment in the effluent gases. The gases leaving the second absorber, and containing some maleic anhydride, maleic acid, other products of oxidation and solvent naphtha, are passed through an absorber, or absorbers, containing water maintained by suitable cooling means at a temperature of about 10° C., whereby residual products of oxidation and considerable quantities of solvent naphtha carried by the gases are absorbed and condensed. The solvent naphtha, after separation from the aqueous solution and drying in any suitable manner, for example by distillation, may be reused in the process. The absorbed residual oxidation products may be recovered as an impure solution of maleic acid. Any solvent naphtha remaining in the gases leaving the water absorbers may be recovered by absorption in a suitable relatively non-volatile liquid absorbing agent for the solvent naphtha, as for example straw oil; for example by passing the gases through a tower or towers filled with packing rings or other inert surface-giving packing material and through which the liquid absorbing agent is circulated. The solvent naphtha may be recovered from the absorbing agent by distillation, and reused in the process. The solvent naphtha may also be recovered from the effluent gases by treatment with solid absorbing agent, such as silica gel, activated carbon, etc.; for example by passing the gases through a tower or towers packed with a suitable granular absorbing agent from which the solvent naphtha may be recovered for reuse by heating.

Instead of separating the maleic anhydride from the absorbing liquid by cooling the solution thereof in the absorbing liquid, the solution may be subjected to fractional distillation, at either atmospheric or sub-atmospheric pressure, and the maleic anhydride recovered separately from the absorbing liquid, which may be reused in the process.

It is to be understood that the invention is not limited to the above examples, and that the various proportions and conditions cited are all capable of wide variation.

The ratio of benzene to air employed in the oxidation process may be varied within wide limits; for example, ratios of about 4 to 50 parts by weight of air to one part by weight of benzol may be employed; and instead of air, oxygen, ozone, or other oxygen-containing gas mixtures may be used. The reaction temperature also may vary from about 375° to 550° C., and the time of contact may be from about 0.10 to 2.0 seconds. Furthermore, pressures at, above, and below atmospheric may be used in carrying out the oxidation.

In recovering the maleic anhydride from the reaction mixture, cooling of the gas stream leaving the converter is not essential, but it is preferred since it enables operation of the absorber under more economical conditions. The absorber may be constructed in any suitable manner known to the art, and may consist of a single unit (such as, a tower filled with packing rings or other inert surface-giving packing material, or a vessel containing bubbler-plates, baffles, or the like), or it may be composed of a number of such units in series. The absorbing liquid may be circulated through the absorber, countercurrent to the gas stream, or otherwise, so as to act as a washer or scrubber for said stream, or the gas may be bubbled through a stationary body or bodies of absorbing liquid. Furthermore, the absorption may be made continuous or semi-continuous in any well-known manner, for example, by properly adjusting the quantity and rate of flow of the circulating absorption liquid (if the circulating type of absorber is used) so that a saturated solution of maleic anhydride will be continuously formed and removed; or by removing the liquid when it becomes saturated, and replacing it with fresh or recovered liquid; or (if a series of stationary batches of absorbing liquid is used) by discharging the vessel containing the saturated liquid and filling it with partially saturated liquid from one of the other vessels which itself then may be charged with fresh or recovered absorbing liquid.

The process may also be carried out by introducing vapors of the absorbent into the gas stream and jointly condensing said vapors with the maleic anhydride while leaving the water vapor and other undesired constituents of the gaseous mixture uncondensed.

The temperature at which the absorption is caused to take place may vary within wide limits, although temperatures of 45° to 70° C. are preferred; since for any given vapor mixture the amount of maleic anhydride absorbed per unit weight of absorbing liquid decreases with increase in temperature. Thus, at temperatures of about 110° C., the amount of maleic anhydride absorbed from the gaseous mixtures employed in the above examples is very small. Temperatures below 45° C. may also be employed, but it has been found that at such temperatures there results a decrease in the amount of maleic anhydride recovered from the gaseous mixtures employed in the above examples; for at temperatures of about 40° C. or lower, water condenses to some extent and converts a portion of the anhydride to maleic acid. It is noted that with a reaction mixture and operating conditions such as are above described, and with absorption temperatures of about 45° to about 70° C., the absorption takes place satisfactorily, and moreover the water-vapor present in the gas stream has no substantial hydrating effect upon the maleic anhydride.

Instead of separating the maleic anhydride from its solution in the absorbing liquid by cooling the solution, the absorbing liquid may be removed from the maleic anhydride by fractional distillation and recovered separately, as described above in connection with Example 2. The recovered absorbing liquid may be reused in the process.

While in the preferred practice of the invention the maleic anhydride is absorbed in an inert water-immiscible liquid to remove it from the reactive influence of the water vapor present in the vapor mixture subjected to treatment, the process also can be carried out without the use of such absorbent. Thus, a vapor mixture containing maleic anhydride and water vapors can be cooled below the dew-point of the mixture with respect to maleic anhydride, while retaining the water in the vapor form, the resulting maleic anhydride condensate and the remaining uncondensed vapors can be separately withdrawn, and the maleic anhydride condensate collected in a receiver adapted to hold it out of contact with the remaining vapors. For example, the gas mixture of the above examples can be cooled to about 55° C. by contact with a cooling surface and the resulting liquid condensate run off, as formed, into a receiver while separately drawing off the remaining uncondensed vapors.

Furthermore, in the above purification process, the crude crystals of maleic anhydride may be dissolved in other volatile solvents besides solvent naphtha, particularly solvents having a boiling-point higher than the melting-point of maleic anhydride, such as for example, benzene, toluene, heavy solvent, cumene, etc. The quantity of solvent used need not be limited to the above proportions, but may be varied within considerable limits, since molten maleic anhydride is substantially miscible in all proportions with some solvents, as for example, solvent naphtha. The proportions of solvent above given are preferred, however, for economical operation and ease of handling, as they provide a fluid slurry of crystals and mother-liquor upon crystallization. The temperature at which the solution is effected preferably should be above the melting-point of maleic anhydride, but it preferably should not exceed about 70° C.; inasmuch as it has been found that at higher temperatures maleic acid, which sometimes may be present in small amounts, tends to go into solution in the molten maleic anhydride. By effecting the solution with molten maleic anhydride, the amount of solvent required, and consequently the amount of maleic anhydride remaining in the mother-liquor, is greatly decreased.

While the process of the invention has been described with particular reference to the recovery of maleic anhydride from gaseous mixtures, and particularly those containing it together with water vapor, the process is not limited thereto but may be employed for the recovery of other organic compounds which react with water. For example, the process is applicable to the recovery of anhydrides of other organic polycarboxylic acids from gaseous mixtures containing the same, particularly gaseous mixtures which also contain water vapor, and especially gaseous reaction mixtures resulting from the vapor-phase catalytic oxidation of organic compounds; as for example, phthalic anhydride, naphthalic anhydride, etc. The process also may be employed for the separation and recovery of a plurality of partial oxidation products from a gaseous mixture containing them. Thus, for example, phthalic anhydride and maleic anhydride may each be separately recovered from a gaseous reaction mixture resulting from the vapor-phase catalytic partial oxidation of naphthalene or other organic material by passing the gaseous reaction mixture in contact with a suitable absorbent maintained under temperature and pressure conditions suitable for the absorption of phthalic anhydride and unsuitable for the absorption of the other products contained in the gaseous mixture (for example, diphenyl oxide maintained at a temperature of about 85° to about 105° C.), then passing the residual gaseous mixture in contact with a suitable absorbent maintained under temperature and pressure conditions suitable for the absorption of maleic anhydride but not other constituents of the gaseous mixture, such as water and carbon dioxide (as for example, alpha-chloronaphthalene maintained at a temperature of about 45° to about 60° C.), and recovering the phthalic anhydride and maleic anhydride from their respective solutions.

The invention is furthermore not limited to the employment as absorbents of the substances above specifically disclosed, but includes equivalent substances which will dissolve the organic oxidation products under the indicated temperature and pressure conditions. For example, substances may be employed as absorbents which are normally solids but which are liquids under the absorption conditions, as for example, naphthalene, particularly crude naphthalenes; and it is intended to include such substances within the scope of the expression "a liquid" in this description and the claims. Furthermore, other normally liquid absorbents may be used; such as esters of mono- or poly-carboxylic acids (for example diethyl- or dibutyl-phthalate or maleate, etc.), particularly under absorption conditions which preclude the condensation of substantial amounts of water.

It will be understood that the term "catalytic maleic anhydride", as used in the claims, refers to and is limited to a maleic anhydride which has been prepared by the partial or selective oxidation of an organic body, as for example benzene, in the vapor phase by means of a gas containing free oxygen in contact with a suitable catalyst.

Since, in the practice of the invention, changes may be made in the details of the above disclosure and in the process above described without departing from the scope of the invention, it is intended that all matter contained in the above description shall be interpreted as illustrating, and not limiting, the invention, except as limited by the claims.

This application is a continuation-in-part of my application Serial No. 595,431, filed February 26, 1932, which is in part a continuation of my application Serial No. 297,091, filed August 2, 1928 for Production of maleic anhydride, issued as United States Patent 1,895,522 on January 31, 1933.

I claim:
1. The method of recovering maleic anhydride from a mixture containing maleic anhydride and water vapors, which comprises condensing maleic anhydride from said vapor mixture at a temperature at which maleic anhydride reacts with water to form maleic acid, while retaining in the vapor form the water in the vapor mixture by maintaining the water vapor pressure of said vapor mixture below the vapor pressure of liquid water at said temperature, and removing the maleic anhydride condensate from the reactive influence of the water vapor.

2. The method of recovering maleic anhydride from a mixture containing maleic anhydride and water vapors, which comprises cooling said vapor mixture to a temperature which is below 100° C. and which is below the dew-point of the vapor mixture with respect to maleic anhydride, while maintaining the water vapor pressure of said vapor mixture below the vapor pressure of liquid water at said temperature, whereby maleic anhydride is separated from said vapor mixture in a non-vapor form while the water is retained in the vapor form, and removing the resulting maleic anhydride from the reactive influence of the water in the vapor form.

3. The method of recovering maleic anhydride from a mixture containing maleic anhydride and water vapors which comprises condensing maleic anhydride from said vapor mixture at a temperature at which maleic anhydride reacts with water to form maleic acid, in the presence of sufficient inert gas to retain the water in the vapor form, and removing the maleic anhydride condensate from the reactive influence of the water vapor.

4. The method of recovering maleic anhydride from a gaseous mixture which is at an elevated temperature and which contains maleic anhydride and water vapors and an inert gas, which comprises cooling the gaseous mixture to a temperature below the dew-point of the mixture with respect to maleic anhydride, to condense maleic anhydride, while having present an amount of inert gas not substantially less than that required to retain the water in the vapor form, said temperature also being sufficiently low to condense the water vapor in the absence of the inert gas under the existing pressure conditions, and removing the maleic anhydride condensate from the reactive influence of the water vapor.

5. The method of producing maleic anhydride which comprises forming a mixture of air and vapors of an organic substance which upon oxidation produces maleic anhydride, passing the mixture in contact with an oxidation catalyst under conditions adapted to produce maleic anhydride, absorbing maleic anhydride from the resulting gas mixture in an inert water-immiscible organic liquid which is a solvent for maleic anhydride maintained at a temperature of about 45° to about 70° C., and recovering maleic anhydride from the resulting solution.

6. The method of producing maleic anhydride which comprises forming a mixture of air and vapors of an organic substance which upon oxidation produces maleic anhydride, passing the mixture in contact with an oxidation catalyst under conditions adapted to produce maleic anhydride, and absorbing maleic anhydride from the resulting gaseous reaction mixture in an inert water-immiscible organic liquid which is a solvent for maleic-anhydride maintained at a temperature of about 45° to about 70° C., the amount of air employed in the oxidation being such that the dew-point of the gaseous reaction mixture with respect to water is below said temperature.

7. The method of producing maleic anhydride which comprises forming a mixture containing 4 to 20 parts by weight of air per part by weight of benzene, passing the mixture in contact with an oxidation catalyst under conditions adapted to produce maleic anhydride, absorbing maleic anhydride from the resulting gas mixture at a temperature of about 45° to about 70° C. in an inert water-immiscible organic liquid which is a solvent for maleic anhydride, and recovering maleic anhydride from the resulting solution.

8. The method of recovering maleic anhydride from a gaseous reaction mixture produced by forming a mixture of air and vapors of benzene and passing the mixture in contact with an oxidation catalyst under conditions adapted to produce maleic anhydride, which comprises absorbing maleic anhydride from the gaseous reaction mixture in alpha-chlornaphthalene, crystallizing maleic anhydride from the resulting solution, separating the crystals from the mother liquor and recrystallizing the crystals from a volatile solvent.

9. The method of recovering maleic anhydride from a gaseous reaction mixture produced by forming a mixture containing about 25 parts by weight of air per part by weight of benzene, and passing the mixture in contact with an oxidation catalyst under conditions adapted to produce maleic anhydride, which comprises absorbing maleic anhydride from the gaseous reaction mixture in alpha-chlor-naphthalene, crystallizing maleic anhydride from the resulting solution, dissolving the resulting maleic anhydride in molten condition in a solvent therefor, and crystallizing maleic anhydride from the resulting solution.

10. The method of recovering maleic anhydride from a gaseous reaction mixture produced by forming a mixture of air and vapors of an organic substance which upon oxidation produces maleic anhydride, and passing the mixture in contact with an oxidation catalyst under conditions adapted to produce maleic anhydride, which comprises absorbing maleic anhydride from the gaseous reaction mixture in solvent naphtha maintained at a temperature of about 45° to about 70° C., and recovering maleic anhydride from the resulting solution.

11. In the production of maleic anhydride, the step which comprises dissolving molten maleic anhydride in a solvent therefor.

12. In the production of maleic anhydride in a purified condition, the step which comprises dissolving molten catalytic maleic anhydride at a temperature not above 70° C. in an inert volatile solvent therefor, and separating maleic anhydride from the resulting solution.

13. The method of recovering the anhydride of an organic polycarboxylic acid from a mixture containing vapor of the anhydride and water vapor, which comprises condensing the anhydride in the presence of an inert water-immiscible solvent therefor while retaining the water in the vapor form.

14. The method of recovering maleic anhydride from a mixture containing maleic anhydride and water vapors, which comprises condensing maleic anhydride in the presence of an inert water-immiscible solvent therefor while retaining the water in the vapor form.

15. The method of recovering maleic anhydride from a gaseous mixture containing maleic anhydride and water vapors and an inert gas, which comprises condensing the maleic anhydride in the presence of an inert water-immiscible solvent therefor while retaining the water vapor in the gas mixture.

16. The method of recovering maleic anhydride from a mixture containing maleic anhydride and water vapors, which comprises condensing maleic anhydride in the presence of an inert water-immiscible solvent therefor at a temperature below the boiling point of water under the existing pressure conditions while retaining the water in the vapor form.

17. The method of recovering maleic anhydride from a gaseous mixture containing maleic anhydride and water vapors and an inert gas, which comprises condensing the maleic anhydride in the presence of an inert water-immiscible solvent therefor at a temperature below the boiling point of water under the existing pressure conditions while retaining the water vapor in the gas mixture by means of said inert gas.

18. The method of recovering maleic anhydride from a gaseous mixture which is at an elevated temperature and which contains maleic anhydride and water vapors and an inert gas, which comprises cooling the gaseous mixture to a temperature below the dew-point of the mixture with respect to maleic anhydride, to condense maleic anhydride, while having present an amount of inert gas not substantially less than that required to retain the water in the vapor form, said temperature also being sufficiently low to condense the water vapor in the absence of the inert gas under the existing pressure conditions, and contacting the gaseous mixture with an inert water-immiscible organic liquid which is a solvent for maleic anhydride.

19. The method of recovering maleic anhydride from a gaseous mixture which is at an elevated temperature and which contains maleic anhydride and water vapors and an inert gas, which comprises contacting the gaseous mixture with an inert organic liquid which is a solvent for maleic anhydride and which is at a temperature below the dew-point of the mixture with respect to maleic anhydride but above the dew-point of the mixture with respect to water, said temperature also being sufficiently low to condense the water vapor in the absence of the inert gas under the existing pressure conditions, whereby a solution of maleic anhydride in the solvent is produced.

20. The method of recovering the anhydride of an organic polycarboxylic acid from a gaseous mixture containing vapor of the anhydride, water vapor, and an inert gas, which comprises condensing the anhydride in the presence of an inert water-immiscible solvent therefor while retaining the water vapor in the gas mixture.

21. The method of recovering the anhydride of an organic polycarboxylic acid from a gaseous mixture containing vapor of the anhydride, water vapor and an inert gas, which comprises absorbing the anhydride in an inert water-immiscible solvent therefor at a temperature below the dew-point of the gaseous mixture with respect to the anhydride in the presence of sufficient inert gas to retain the water vapor in the gas mixture.

22. The method of recovering the anhydride of an organic dicarboxylic acid which is a solid under normal conditions of temperature and pressure from a gaseous mixture containing vapor of the anhydride, water vapor and an inert gas, which comprises absorbing the anhydride in an inert water-immiscible liquid which is a solvent for said anhydride maintained at a temperature below the dew-point of the gaseous mixture with respect to the anhydride and above the dew-point of the gaseous mixture with respect to water.

23. The method of recovering maleic anhydride from a mixture containing maleic anhydride and water vapors, which comprises condensing the maleic anhydride in the presence of an inert water-immiscible liquid which is a solvent for maleic anhydride while having present an amount of inert gas not substantially less than that required to retain the water in the vapor form.

24. The method of recovering maleic anhydride from a gaseous mixture containing maleic anhydride and water vapors and an inert gas, which comprises condensing the maleic anhydride in the presence of an inert water-immiscible liquid which is a solvent for maleic anhydride, at a temperature below the boiling point of water under the existing pressure conditions and below the dew-point of the gaseous mixture with respect to maleic anhydride while substantially retaining the water vapor in the gas mixture.

25. The method of recovering maleic anhydride from a gaseous mixture containing maleic anhydride and water vapors, which comprises absorbing said maleic anhydride in an inert water-immiscible organic liquid which is a solvent for maleic anhydride maintained at a temperature below the boiling point of water under the existing pressure conditions and below the dew-point of the gaseous mixture with respect to maleic anhydride in the presence of an amount of inert gas not substantially less than that required to retain the water vapor in the gas mixture.

26. The method of recovering maleic anhydride, which comprises passing a gaseous mixture containing maleic anhydride and water vapors and an inert gas into contact with an inert water-immiscible organic liquid which is a solvent for maleic anhydride maintained at a temperature below the boiling point of water under the existing pressure conditions and below the dew-point of the gaseous mixture with respect to maleic anhydride and above the dew-point of the gaseous mixture with respect to water.

27. The method of recovering maleic anhydride from a gaseous mixture containing catalytic maleic anhydride and water vapors and an inert gas, which comprises absorbing said maleic anhydride in an inert water-immiscible liquid which is a solvent for maleic anhydride maintained at a temperature below the boiling point of water under the existing pressure conditions and below the dew-point of the gaseous mixture with respect to maleic anhydride and above the dew-point of the gaseous mixture with respect to water, whereby maleic anhydride is condensed while water vapor is retained in the gas mixture.

28. The method of recovering maleic anhydride, which comprises passing a gaseous mixture containing maleic anhydride and water vapors and an inert gas into contact with alpha-chlornaphthalene maintained at a temperature of about 45° to about 60° C. in the presence of an amount of inert gas not substantially less than that required to retain the water vapor in the gas mixture, and recovering maleic anhydride from the resulting solution.

29. The method of recovering maleic anhydride from a gaseous reaction mixture produced by forming a mixture of air and vapors of an organic substance which upon oxidation produces maleic anhydride, and passing the mixture in contact with an oxidation catalyst under conditions adapted to produce maleic anhydride, which comprises condensing maleic anhydride from the gaseous reaction mixture in the presence of an inert water-immiscible organic liquid while substantially retaining the water vapor in the gas mixture.

30. The method of recovering maleic anhydride from a gaseous reaction mixture produced by forming a mixture containing 4 to 50 parts by weight of air per part by weight of an organic substance which upon oxidation produces maleic anhydride, and passing the mixture in contact with an oxidation catalyst under conditions adapted to produce maleic anhydride, which comprises absorbing maleic anhydride from the gaseous reaction mixture in an inert water-immiscible organic liquid which is a solvent for maleic anhydride and which is maintained at a temperature below the boiling point of water under the existing pressure conditions and below the dew-point of the gaseous reaction mixture with respect to maleic anhydride and above the dew-point of the gaseous reaction mixture with respect to water, whereby maleic anhydride is condensed while water vapor is retained in the gas mixture.

ELTON B. PUNNETT.